(12) United States Patent
Greene

(10) Patent No.: US 8,167,322 B2
(45) Date of Patent: May 1, 2012

(54) STABLE SHOP AND FIELD WELDING CART

(76) Inventor: Terry Greene, Las Vegas, NV (US)

( * ) Notice: Subject to any disclaimer, the term of this patent is extended or adjusted under 35 U.S.C. 154(b) by 106 days.

(21) Appl. No.: 12/849,817

(22) Filed: Aug. 4, 2010

(65) Prior Publication Data

US 2012/0032408 A1 Feb. 9, 2012

(51) Int. Cl.
*B62B 3/10* (2006.01)
(52) U.S. Cl. .......... 280/47.26; 280/79.5; 280/79.2; 280/47.34; 280/47.24; 280/79.11
(58) Field of Classification Search .......... 280/47.26, 280/47.27, 79.5, 79.6, 79.7, 6.15, 6.16, 651, 280/676, 656, 37, 639, 124.127, 124.139, 280/124.158, 124.159, 79.2, 79.4, 47.34, 280/124.11, 47.24, 79.11, 47.35
See application file for complete search history.

(56) References Cited

U.S. PATENT DOCUMENTS

| | | | | |
|---|---|---|---|---|
| 1,244,030 | A * | 10/1917 | Cave ........................ | 239/71 |
| 3,174,736 | A | 3/1965 | Cameron | |
| 3,472,392 | A * | 10/1969 | Hahn ........................ | 211/126.14 |
| 3,651,894 | A * | 3/1972 | Auriemma ................. | 188/19 |
| 4,609,200 | A * | 9/1986 | Winter ...................... | 280/5.2 |
| 4,778,154 | A | 10/1988 | Cortez | |
| 4,802,515 | A * | 2/1989 | Pytryga et al. ............. | 141/97 |
| D322,501 | S * | 12/1991 | Legault ...................... | D34/24 |
| 5,658,118 | A * | 8/1997 | Luca ......................... | 414/444 |
| 5,693,286 | A | 12/1997 | Hatanaka | |
| 6,000,712 | A * | 12/1999 | Wu .......................... | 280/639 |
| 6,102,497 | A * | 8/2000 | Ehr et al. ................. | 312/209 |
| 6,109,644 | A | 8/2000 | Cox | |
| 6,116,623 | A * | 9/2000 | Salvucci .................. | 280/47.26 |
| 6,179,306 | B1 * | 1/2001 | Maxwell .................. | 280/47.26 |
| 6,193,256 | B1 * | 2/2001 | Banary, Jr. ............... | 280/400 |
| 6,334,622 | B1 * | 1/2002 | Romero .................... | 280/47.26 |
| 6,497,423 | B1 * | 12/2002 | Perelli et al. ............. | 280/47.34 |
| 6,817,360 | B2 * | 11/2004 | Hikosaka et al. ........ | 128/202.27 |
| 6,827,357 | B2 * | 12/2004 | Calmeise et al. ......... | 280/47.34 |
| 6,942,238 | B1 * | 9/2005 | DeCarlo .................... | 280/651 |
| 7,014,199 | B2 * | 3/2006 | Hendzel .................... | 280/47.35 |
| 7,114,732 | B1 * | 10/2006 | Ismail ....................... | 280/47.34 |
| 7,168,714 | B2 * | 1/2007 | Gibbs ....................... | 280/47.34 |
| 7,438,084 | B2 * | 10/2008 | Trettin et al. ............. | 137/355.16 |
| 7,648,147 | B2 * | 1/2010 | Lauer et al. .............. | 280/47.35 |
| 7,661,685 | B2 * | 2/2010 | Thibault ................... | 280/47.35 |
| 2002/0109318 | A1 * | 8/2002 | Calmeise et al. ......... | 280/47.35 |
| 2002/0117819 | A1 * | 8/2002 | Calmeise et al. ......... | 280/47.35 |
| 2003/0122331 | A1 * | 7/2003 | DiGiacomo et al. ..... | 280/47.35 |
| 2003/0155730 | A1 * | 8/2003 | Chu et al. ................. | 280/47.35 |
| 2003/0164600 | A1 * | 9/2003 | Dunn et al. ............... | 280/47.34 |
| 2004/0108670 | A1 * | 6/2004 | Hendzel ................... | 280/47.35 |

(Continued)

*Primary Examiner* — J. Allen Shriver, II
*Assistant Examiner* — Erez Gurari
(74) *Attorney, Agent, or Firm* — Connie R. Masters

(57) ABSTRACT

A portable hand cart particularly suited for carrying a welding system is provided. The cart includes a bottom platform carried by a rectangular bottom frame; a back frame extending upward from the bottom frame and including an angled handle; a top platform carried by a rectangular top frame that is somewhat narrower than the bottom frame; a front frame extending upward from the front sides of the bottom frame; two front wheels; two back pneumatic wheels; a lower tank frame extending rearward from the back bottom frame and supporting a tank platform; and an upper tank cradle extending rearward from the back of the top frame. The cart is stable and balanced both in a shop and in the field when loaded with a welding system and with or without a compressed gas cylinder.

16 Claims, 3 Drawing Sheets

U.S. PATENT DOCUMENTS

| | | | |
|---|---|---|---|
| 2004/0227315 A1* | 11/2004 | Van Landingham, Jr. | 280/47.35 |
| 2005/0012286 A1* | 1/2005 | Woodrow | 280/47.35 |
| 2006/0232032 A1* | 10/2006 | Goldberg | 280/47.35 |
| 2006/0232033 A1* | 10/2006 | Pint | 280/79.2 |
| 2008/0029981 A1* | 2/2008 | Dukes | 280/47.35 |
| 2008/0143069 A1* | 6/2008 | Richards et al. | 280/47.35 |
| 2011/0169249 A1* | 7/2011 | Lindner et al. | 280/651 |

* cited by examiner

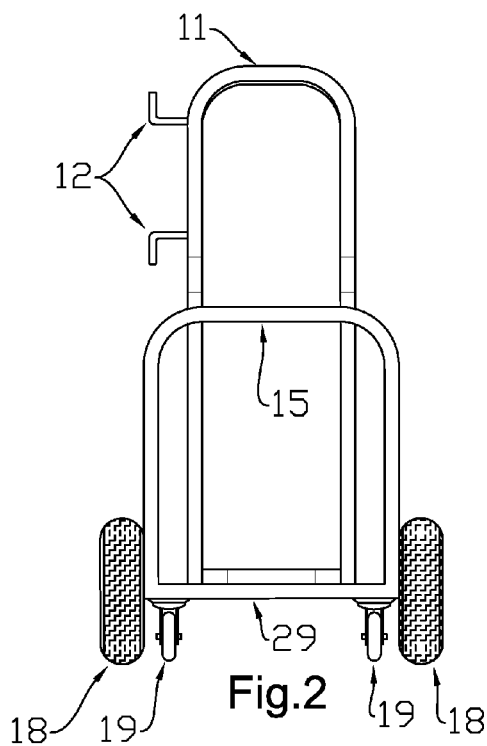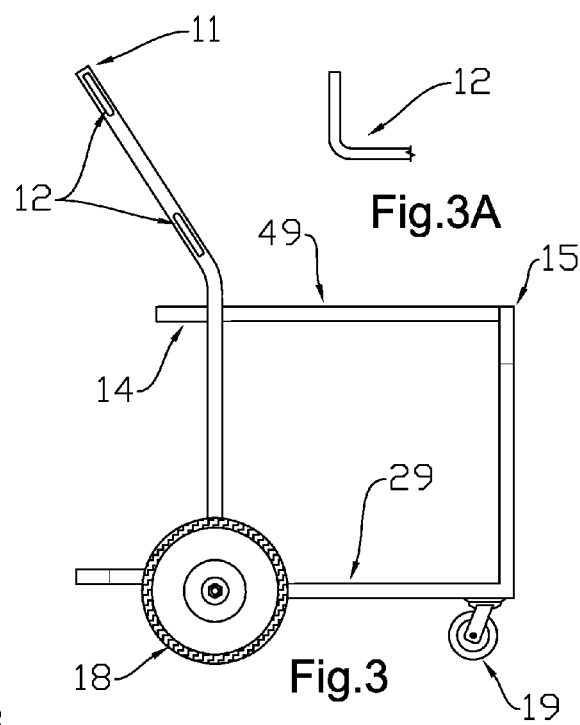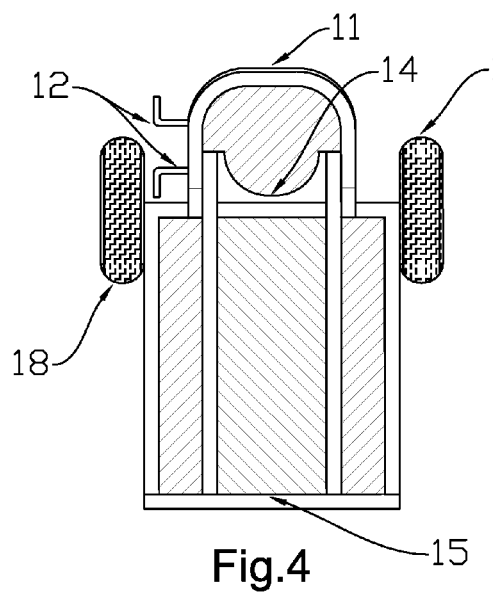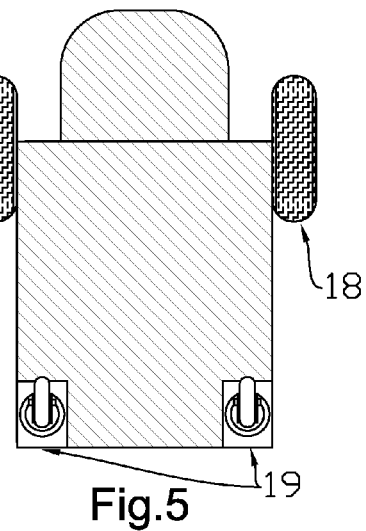

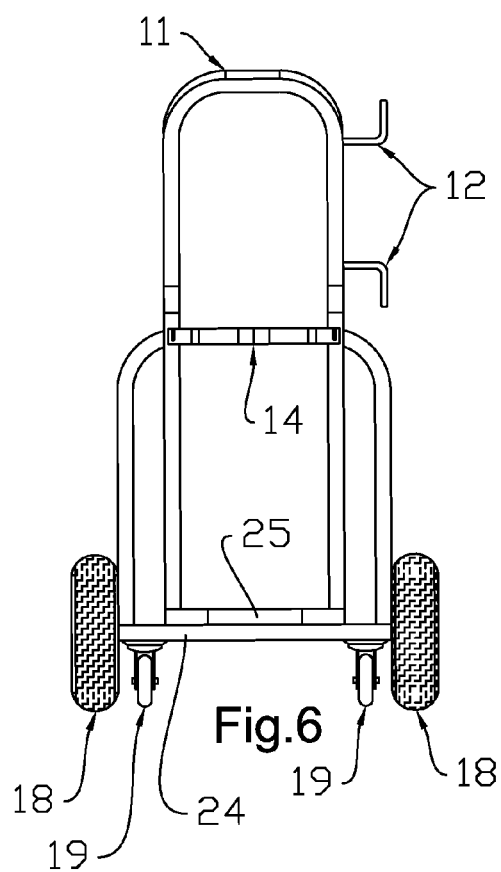
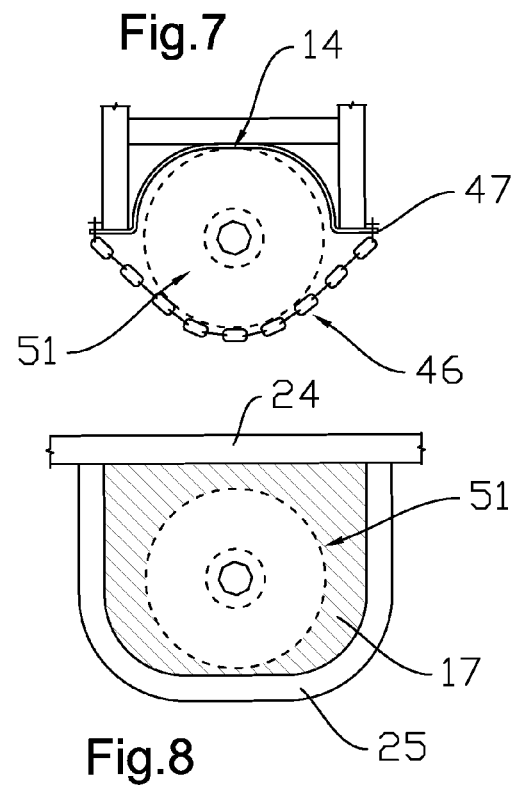

STABLE SHOP AND FIELD WELDING CART

FIELD OF THE INVENTION

The present invention relates generally to welding equipment carts, and more particularly, to a new four-wheeled cart suitable for field use or shop use that is stable and balanced while transporting welding equipment, with or without carrying a compressed gas tank.

BACKGROUND INFORMATION

Welding carts designed for use in welding shops have been available almost as long as welder operators have been using gas or electric welding and cutting equipment. But generally less than half of all welding is done in the comfort of the shop—most is done in the field. Yet few improvements have been made for field welding carts. Preferably a field cart would be light enough to be loaded into a work vehicle for transport from the shop to the field, would be easy to move over the rough terrain of a construction site, would safely support and carry a compressed gas cylinder, would safely carry any of a variety of types of welding or mechanical equipment, but would also be compact and convenient for use in the confines of the shop environment.

Most current welding carts are not suitable for both shop and field use. For instance, U.S. Pat. No. 7,114,732 titled "All-Terrain Welding Cart" issued Oct. 3, 2006 to Jeffery A. Ismail is designed for use in the field in rough terrain and designed for pulling by a hitch, but it is too large and cumbersome for use in a shop. It does not appear to be configured for road use, so moving it from job site to job site would require loading it onto a road-use trailer or into a truck. But even when empty, it appears too heavy to be lifted into a truck for transport, yet it is designed to carry equipment making it significantly heavier and even more difficult to handle. Pulling it by hand through rough terrain and up a hillside would be too labor intensive, requiring a vehicle to pull it in most situations. Its design and size are similar to a trailer which, though suitable for wide open field areas, would not be suitable in most shops where there is limited room. Further, the heavy compressed gas cylinder must be lifted into the top frame. In contrast, the present invention can be loaded into a work vehicle with ease. It can be pushed by hand through rough terrain without the need for a vehicle to pull it, and it is still small enough to be used in a shop without taking up a large amount of room. Also, the present invention does not require that the heavy compressed gas cylinder be lifted to the top of the cart.

Other conventional welding carts are not suitable for rough field use. For example, U.S. Pat. No. 6,116,623 titled "Dual Cylinder Cart with Firewall Divider" issued Sep. 12, 2000 to Frank S. Salvucci provides a cart functional for its intended use to provide a firewall between two cylinders during transport of the cylinders. However, its design makes it suitable for only one welding process, it cannot carry or store equipment or welding units, and it does not have pneumatic tires to travel across rough terrain or loose sand. With this dual cylinder cart it would be very difficult, if not impossible, to access most places outside of a shop or off a hard flat surface.

Some conventional welding carts do not even make allowance for carrying compressed gas cylinders. For example, U.S. Pat. No. 3,174,736 titled "Carriage for Cutting Torches" issued Apr. 20, 1962, to E. H. Cameron depicts a welding torch cart that has been specifically designed to be held in a fixed carriage. It does not allow space to carry a compressed gas cylinder; it does not have pneumatic tires so its ability to move over rough terrain is limited; and it also lacks the ability to hold different sized welders.

Also, the following patents do not have a means to carry a compressed gas cylinder nor do they have suitable tires for traveling over rough field terrain: U.S. Pat. No. 5,693,286 titled "Cart Mounting A Welding Torch or Cutting Torch" issued Dec. 2, 1997, to Isamu Hatanaka, Yariaki Kaneko, and Kenichi Nezu; U.S. Pat. No. D322,501 titled "Welding Cart" issued Dec. 17, 1991, to Timothy J. Legault; and U.S. Pat. No. 4,778,154 titled "Welding Torch Carriage" issued Oct. 18, 1988, to Crespin Cortez, Jr. The Hatanaka cart is designed to run on a stationary track. The Legault welding cart is an all-purpose carrying cart and has only back wheels. The Cortez welding torch cart has wheels with a peripheral knife edge.

Another problem with currently available welding carts is the lack of stability and balance and lack of suitable platforms and holders for the equipment that is required to be carried. These problems are intensified by the variety of loads that are necessarily carried in diverse work environments. A welding cart should remain stable when loaded with or without a heavy compressed gas cylinder, when loaded with miscellaneous tools, and when loaded with differing sizes and types of welding machines. Yet many conventional welding carts are top heavy when loaded or when the compressed gas cylinder is carried. Many conventional carts do not have satisfactory platforms, shelves, or holders for safely securing and transporting standard welding equipment and tools.

For example, U.S. Pat. No. 6,109,644 titled "Utility Wagon" issued Aug. 29, 2000, to Lem L. Cox discloses a utility wagon having an adjustable base upon which can be mounted one of a variety of different chassis. It is not specifically designed for a welding unit or a compressed gas cylinder, so it has no mechanism to support the cylinder or to carry the cylinder in a safe manner. Nor does this wagon have a platform to support a welding unit or an area to store other tools or accessories.

Due to the acknowledged problems with using a conventional welding cart in the field, such as safely carrying a heavy compressed gas cylinder and moving the cart over rough terrain, attempts have been made to avoid using gas welding processes in the field. In fact, many advances in welding process have been made over the years specifically to avoid carrying the compressed gas cylinder. But those processes tend to be very messy and expensive; the gas welding process is cleaner and more cost effective. In some cases gas processes are required on job sites making carrying a compressed gas cylinder unavoidable. The present invention eliminates the draw backs in using the gas welding process and in transporting the compressed gas cylinder inside the shop, on a construction site, or out in rough terrain.

A number of currently available welding carts have other problems. Some are not balanced when loaded, but may tip over during use. Some are not durable, which is a significant problem considering the punishing work environment to which a typical welding cart is subjected. Commonly currently available welding cars are manufactured of flat or bent sheet metal that is typically assembled by the purchaser by bolting the numerous pieces together. While a welding cart so constructed may be shipped in a smaller package, the resulting cart is flimsy and unsubstantial when loaded for use. It is also more prone to tipping over and to breaking when taken over rough surfaces. Thus currently available welding carts are not sufficiently robust and long lasting.

Some currently available welding carts lack an efficient method to roll and store electrical extension cords to power equipment transported on the welding card. For example, some have no cord hangers, or the hangers they have are positioned low so the operator must bend down to access them. Or the included hangers are small and so are only suitable for a short electrical cord, yet often the work site is far from the nearest electrical outlet, so the cord necessarily may be over one hundred feet long.

Accordingly, there is an established need for a durable, stable welding cart that is convenient and serviceable for use in a shop or in the field, that is balanced and stable when loaded with or without a compressed gas cylinder, and that is configured with suitable platforms and holders for securing and transporting standard welding tools and equipment.

SUMMARY OF THE INVENTION

The present invention is directed to a portable hand-operated welding cart that is convenient and appropriate for use both in the field and in the shop. The welding cart includes a bottom platform supported by a rectangular bottom frame; a back frame extending upward from the bottom frame and including an angled handle; a top platform supported by a top frame that is somewhat narrower than the bottom frame; a front frame extending upward from the front sides of the bottom frame and forming a left front frame, a top front frame, and a right front frame from a single piece of metal; two front wheels; two back pneumatic wheels; a lower tank frame extending rearward from the back of the bottom frame and supporting a tank platform; and an upper tank cradle extending rearward from the back of the top frame past the back frame. The cart is stable and balanced when loaded with standard welding tools and equipment, both when carrying a compressed gas cylinder and when loaded without the cylinder.

An object of the present invention is to provide a welding cart that is suitable for carrying welding equipment.

A further object of the present invention is to provide a welding cart that is easy to use in both in a shop environment and in a field environment.

Another object of the present invention is to provide a welding cart that is sized to fit through a shop door.

An additional object of the present invention is to provide a welding cart that is easy to transport in a work vehicle.

Another object of the present invention is to provide a welding cart that is stable and balanced while carrying a welding unit, with or without a compressed gas cylinder.

These and other objects, features and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 2 is a front view showing a preferred embodiment of the welding cart of the present invention;

FIG. 3 is a right side view showing a preferred embodiment of the welding cart of the present invention;

FIG. 3A is a detail view of a hanger for receiving an electrical cord;

FIG. 4 is a top view showing a preferred embodiment of the welding cart of the present invention;

FIG. 5 is a bottom view showing a preferred embodiment of the welding cart of the present invention;

FIG. 6 is a back view showing a preferred embodiment of the welding cart of the present invention;

FIG. 7 is a top view of a back section of a preferred embodiment of the welding cart of the present invention showing a tank cradle used to hold a compressed gas cylinder;

FIG. 8 is a top view of a back section of a preferred embodiment of the welding cart of the present invention showing a tank frame and tank platform configured to hold a compressed gas cylinder; and FIG. 9 is a side view showing a preferred embodiment of the welding cart of the present invention being tilted back for moving over rough terrain with the compressed gas cylinder positioned near the wheel axle, but somewhat rearward to offset the weight on the front of the cart, thus facilitating the continued tilting of the cart during pushing.

Like reference numerals refer to like parts throughout the several views of the drawings.

DETAILED DESCRIPTION OF THE PREFERRED EMBODIMENTS

Figure 1:
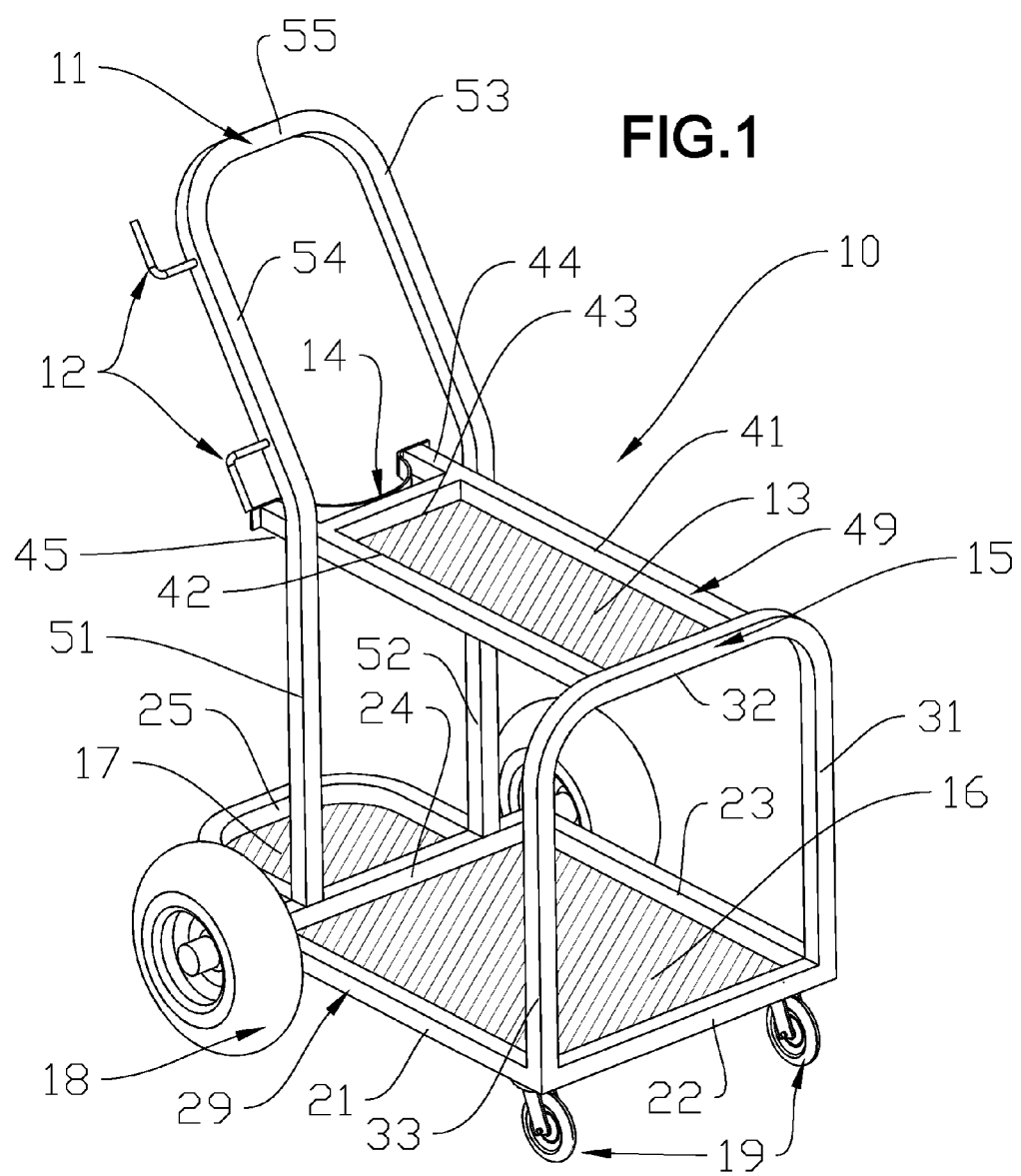
FIG. 1 is a perspective view showing a preferred embodiment of the welding cart of the present invention.

Shown throughout the figures, the present invention is directed toward a portable shop and field welding cart suitable for carrying a welding unit, tools and equipment; it remains balanced and stable when loaded with or without a compressed gas cylinder. The portable welding cart is compact for use in the shop, is easy to roll over rough terrain in the field, is light enough to be manually lifted and loaded into a truck for transport to a new location, is configured to hold different sizes and brands of welding units for use in a variety of welding processes with associated accessories, is formed with a smaller top platform allowing access to the wider base platform, and is designed to be well-balanced and easy to move when carrying any type of welding equipment and when loaded with or without a compressed gas cylinder.

Referring now to FIG. 1, a stable shop and field welding cart, shown generally as reference number 10, is illustrated in accordance with a first embodiment of the present invention. The welding cart 10 includes a bottom platform 16 supported and carried by a rectangular bottom frame 29; a back frame 11 extending upward from the bottom frame 29 and including an angled handle; a top platform 13 supported and carried by a rectangular top frame 49 that is somewhat narrower than bottom frame 29; a front frame 15 extending upward from the front corner area of the bottom frame 29 and supporting the front ends of the top platform 13 and the top frame 49; two front wheels 19; two larger back wheels 18 configured for sand, rocks, or other rough terrain; a lower tank frame 25 extending rearward from the back of bottom frame 29 supporting and carrying a tank platform 17; and an upper tank cradle 14 extending rearward from the back of top frame 49.

The variation in size between the top platform 13 and the bottom platform 16 provides advantages, such as stability and convenience in positioning and transporting of any of a variety of types and sizes of welding units, tools, and welding equipment. The wider bottom platform 16 provides a wider base for stability and a larger area to receive any of a variety of sizes of welding units, yet is narrow enough to be rolled through doorways or small gates. The narrower top platform 13 allows the cart operator access to the welding unit or equipment on the bottom platform. The narrowness of the top platform 13 also enhances stability, as the weight of carried tools and equipment is centered. The top platform 13 holds tools and equipment in a location that is easy to reach, providing quick access to often-used items. The design of the narrower top platform 13 and wider bottom platform 16 decreases the chance of the welding cart 10 tipping over during use compared to conventional welding carts.

The third platform (the rear tank platform 17 supported by the tank frame 25) is positioned to provide optimum balance and stability to the cart 10. The tank platform 17 is located behind the back wheels 18 and, consequently, behind the pivot point when the front of welding cart 10 is lifted with the weight on back wheels 18. The weight of a compressed gas cylinder carried on the lower tank frame 25 will partially offset the weight of a welding unit and/or equipment on the top platform 13 and/or the bottom platform 16, thus increasing the ease with which the operator can move the loaded welding cart 10. This simplifies the carrying of a compressed gas cylinder in the field.

The bottom platform 16 is a substantially planar sheet of metal permanently attached to the bottom frame 29. Bottom frame 29 includes two bottom side frame elements 21, 23, a bottom front frame element 22, and a bottom back frame element 24 disposed at right angles to each other and joined to form a rectangle. The bottom platform 16 is attached to bottom frame 29 in a manner that allows formation of an upward lip by a portion of bottom frame 29, thereby assisting in retaining the equipment stored and transported by the welding cart of the present invention. Preferably the bottom platform 16 is welded to the bottom surfaces of bottom frame 29.

The front frame 15 is permanently connected to, and extends upward from, the opposing front corners of the bottom frame 29. Front frame 15 includes a left front frame element 31, a top front frame element 32, and a right front frame element 33. Preferably the front frame 15 is formed of a single piece of metal for strength, as illustrated, with the single piece of metal bent to form rounded corners between each opposing end of the top front frame element 32 and the vertical frame elements (left front frame element 31 and right front frame element 33). As illustrated, preferably left front frame element 31 and right front frame element 33 are substantially vertical and top front frame element 32 is substantially horizontal.

Top frame 49 includes two generally horizontal top side frame elements 41, 42 and a generally horizontal top back mid-frame element 43. The top platform 13 is a substantially planar sheet of metal permanently attached to the top frame 49 in a manner allowing a portion of top frame 49 to extend upward to form an upward back and two side lips, similar to the lip formed by bottom platform 16 and the bottom frame 29. Similarly, the front of the top lip is formed with front frame 15.

The top frame 49 supporting top platform 16 is permanently joined to front frame 15 with the midpoint of the top platform 16 approximately positioned at the midpoint of top front frame element 32 of front frame 15. Preferably the forward ends of the two top side frame elements 41, 42 are welded to the rearward side of top front frame element 32 in a manner to create a portion of the top lip. The top frame 49 is also permanently joined to a middle area of back frame 11, as illustrated.

The mid-frame element 43 is permanently joined (preferably by welding) to the rear area of the two top side frame elements 41, 42, but offset from the rear ends of the two top side frame elements 41, 42 a pre-determined length, which is preferably approximately equal to the radius of a standard gas cylinder, as illustrated.

Top platform 13 is permanently attached, preferably by welding, to the undersides of the rectangle formed by the two top side frame elements 41, 42, the top back mid-frame element 43, and top front frame element 32.

Attached at the rearward ends of the two top side frame elements 41, 42 and at the mid-frame element 43 is an upper tank cradle 14. Tank cradle 14 is preferably an open semi-circle, having two opposing curved sides with a flat portion disposed between the curved sides, as illustrated. The central flat portion is preferably welded to the mid-frame element 43. The tank cradle 14 is configured to receive the side of a compressed gas cylinder, so the width of the tank cradle 14 is necessarily somewhat wider than the radius of a standard compressed gas cylinder. The tank cradle 14 has a height of approximately the height of the mid-frame element 43. As shown in FIG. 7 and FIG. 9, a chain 46 can be attached via a chain attachment mechanism 47 at or near the ends of upper tank cradle 14 in a manner that allows the chain 46 to removably secure the compressed gas cylinder. The chain connecting component that attaches to the cradle 14 may be a hook, a snubber, a quick release connector, or the like. The chain attachment mechanism may be a loop, a slot, or the like. Optionally, a chain 46 may be permanently attached (not shown) to one side of the tank cradle 14 with the chain attachment mechanisms 47 at the opposing end of the chain. As shown in FIG. 7, the cradle 14 is preferably permanently attached at a rear midsection of mid-frame element 43, as well as at, or across (as shown), the rearward ends of the two top side portions 41, 42.

The back frame 11 extends upward from, and is permanently attached to, the bottom back frame element 24 of bottom frame 29. The back frame 11 includes back left leg 52, back right leg 51, left handle upright 53, right handle upright 54, and horizontal handle portion 55. Preferably, for added strength, back frame 11 is formed of a single piece of metal bent into a configuration to form back left leg 52, back right leg 51, left handle upright 53, right handle upright 54, and horizontal handle portion 55, as illustrated. The lower ends of back left leg 52 and back right leg 51 are permanently attached substantially perpendicularly to bottom back frame element 24, inset from the ends of bottom back frame element 24 slightly to align with top platform 49.

The handle may be used to push, to pull, and/or to tilt the cart 10. The handle comprises left handle upright 53, right handle upright 54, and horizontal handle portion 55. As illustrated the left handle upright 53 and right handle upright 54 are bent rearward at an angle of approximately 15 to 75 degrees from the plane formed by back left leg 52 and back right leg 51. The curved or rounded corners between the opposing ends of horizontal handle portion 55 and the left handle upright 53 and right handle upright 54, respectively, allow the cart operator to use different hand grips for comfort or to adapt to changing terrain.

Two corresponding cord hangers 12 are permanently attached to the exterior, outer edge of right handle upright 54. Hangers 12 are configured to allow a long extension cord to be looped for storage, yet easily removed when needed. Optionally, a second set of corresponding hangers (not shown) may be permanently attached to the exterior of left handle upright 53. The relatively large size and the placement of hangers 12 allow longer extension cords to be stored, thus allowing the cart 10 to be used further from an electrical outlet. The relatively high positioning of the hangers 12 on the side of the handle is advantageous in that an electrical cord can be rolled or unrolled while standing or even while pushing the cart. Consequently, stooping and bending to roll or to free an electrical cord is eliminated, which is beneficial in both in the field setting and in the shop setting. Also, the configuration of the hangers 12 allows a portion of the cord to be unrolled and used. For example, if only ten feet are needed of a hundredfoot cord, then the ten feet can be unrolled with the remainder of the cord neatly and safely retained by the hangers 12.

As illustrated in FIG. 1, FIG. 8, FIG. 9 a lower tank frame 25 supports the rear tank platform 17. The tank frame 25 is attached to the rear of the bottom frame 29. It is positioned to allow the operator to use it as a kick plate to assist in lifting the front wheels to balance the weight of the cart 10 and carried equipment on the back wheels 18. The tank frame 25 extends above the plane of the tank platform 17 to form a tank lip to assist in retaining an object carried by the tank platform, particularly a compressed gas cylinder. Preferably the tank platform 17 is attached to the bottom of tank frame 25, as shown in FIG. 5, by welding. The tank platform 17 is configured to receive, and support the weight of, the bottom of a compressed gas cylinder with the cylinder then leaned toward the cradle 14. The cradle 14 then receives and stabilizes the side of the cylinder 51.

Referring now to the underside of the welding cart 10, as shown in FIG. 5, the left and right front wheels 19 are attached at the forward corners on the underside of bottom platform 16. Preferably the front wheels are of the swivel caster type and are mounted just inside the opposing front corners. Optionally, wheel locks can be provided to lock the front wheels when desired. Alternatively, but less preferably, the two front wheels 19 can be mounted on an axle (not shown). The front wheels support the weight of the front of the cart, yet allow movement in any direction.

The left and right back wheels 18 are attached to an axle operatively attached to the bottom of a rear area of bottom frame 29, approximately aligned with the attachment point of the lower tank frame 25 to the bottom frame 29. Preferably the back wheel axle (not shown) is disposed out of view within the back frame 29. Wheels 18 are held outside the bottom frame 29, the lower tank frame, and bottom platform 16. Back wheels 18 are configured to allow the cart operator to move the cart 10 over rough terrain. Preferably back wheels 18 have somewhat oversized pneumatic tires, though solid tires, semi-pneumatic tires (having a hollow center, but not pressurized), or other tires usable on rough terrain, as are known or may become known in the art, may be used.

The combination of wheels 18 with tires suitable for rough terrain such as may be encountered at a construction site, the aligning of the wheels with the joining of lower tank frame 25 to the bottom frame 29, and the compact size and design of the welding cart 10 increases the carts usefulness in both the shop and field. Though it moves smoothly on flat shop surfaces, it can be navigated around obstacles, over obstructions, and through rough terrain in the field. Additionally, due to the positioning of the axle between the lower tank frame 25 and the bottom frame 29, the cart operator can easily tilt the cart backward when moving over rough terrain with a gas cylinder behind offsetting the forward weight.

The bottom platform, top platform, and tank platform are preferably formed of sheet metal. The front frame 15, back frame 11, tank frame 25, and bottom frame 29 are preferably formed of metal tubular frame pieces welded together for strength and durability. Optionally, other highly durable man-made materials, such as plastic resins may be used for bottom platform, top platform, tank platform, front frame 15, back frame 11, tank frame 25, and bottom frame 29. Thus the welding cart 10 of the present invention can handle the harsh working conditions to which it is subjected and still offer years of reliable use that would be expected in commercial applications.

From the foregoing, it will be apparent that the welding cart 10 of the current invention provides a portable hand cart that can easily transport a variety of welding tools and equipment over rough terrain or within the confines of a shop. Its two platforms and well-positioned electrical extension cord hangers provide convenience and serviceability. Its compact, balanced design allows it to remain stable when loaded, whether or not it is carrying a compressed gas cylinder. Its strong, tubular framework is configured to provide a robust, long-lasting welding cart. Thus the present invention is set apart and unique from all other welding and equipment carts.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A portable hand cart for carrying welding equipment, comprising:
   a rectangular bottom frame;
   a rectangular bottom platform attached to said bottom frame with said bottom frame extending upward from said bottom platform to create a bottom lip;
   a back frame permanently attached to said bottom frame and comprising a left back leg, a right back leg, and an angled handle angled backward between 15 and 75 degrees from a plane formed by said left back leg and said right back leg;
   a top frame permanently attached to a middle area of said back frame, wherein said top frame is narrower than said bottom frame;
   a front frame permanently attached to said bottom frame, wherein said top frame is permanently attached to said front frame;
   a rectangular top platform permanently attached to a portion of said top frame and a portion of said front frame;
   two front wheels operatively attached near the front corners of said bottom platform;
   two rear wheels operatively attached at a back area of said bottom frame;
   a rear-extending lower tank frame permanently attached to a rear area of said bottom frame;
   a tank platform permanently attached to said lower tank frame; and
   a rear-extending upper cradle permanently attached to the back portion of said top frame and extending rearward past a plane formed by said left back leg and said right back leg said upper cradle comprises two curved cradle sides with a flattened cradle portion disposed between said two curved sides; and said upper cradle has a width somewhat wider than the radius of a standard gas cylinder.

2. The portable hand cart for carrying welding equipment, as recited in claim 1, wherein said two rear wheels comprise pneumatic tires.

3. The portable hand cart for carrying welding equipment, as recited in claim 2, wherein said two front wheels comprise swivel castor-type wheels.

4. The portable hand cart for carrying welding equipment, as recited in claim 3, further comprising two opposing cord hangers disposed on said angled handle of said back frame and configured for receiving an electrical extension cord.

5. The portable hand cart for carrying welding equipment, as recited in claim 4, wherein:
   said front frame comprises a left front frame element, a top front frame element, and a right front frame element, and wherein said front frame is formed of a single piece of material bent to form said left front frame element, said top front frame element, and said right front frame element; and said back frame is formed of a single piece of material bent to form said left back leg, said right back leg, and said angled.

6. The portable hand cart for carrying welding equipment, as recited in claim 4, further comprising a chain having two opposing chain ends and suitable for restraining a compressed gas cylinder, wherein:
   a first one of said two opposing chain ends is permanently attached to a rearward portion of a first one of said two curved cradle sides, and
   a second one of said two opposing chain ends is configured with a chain connecting component adapted for connecting said chain; and
   the rearward portion of a second one of said two curved cradle sides is configured with a chain attachment mechanism adapted for receiving said chain connecting component.

7. The portable hand cart for carrying welding equipment, as recited in claim 4, wherein the rearward portion of each of said two curved cradle sides is configured with a chain attachment mechanism adapted for receiving a portion of a chain for restraining a compressed gas cylinder.

8. The portable hand cart for carrying welding equipment, as recited in claim 4, wherein said rectangular bottom frame, said back frame, said top frame, said front frame, said lower tank frame, said bottom platform, said top platform, and said tank platform are formed of a highly durable manmade material.

9. The portable hand cart for carrying welding equipment, as recited in claim 8, wherein said highly durable manmade material comprises fiberglass.

10. The portable hand cart for carrying welding equipment, as recited in claim 8, wherein said highly durable manmade material comprises plastic.

11. The portable hand cart for carrying welding equipment, as recited in claim 7, wherein:
    said rectangular bottom frame, said back frame, said top frame, said front frame, and said lower tank frame are formed of tubular metal; and
    said bottom platform, said top platform, and said tank platform are formed of sheet metal.

12. The portable hand cart for carrying welding equipment, as recited in claim 11, wherein:
    said left back leg has a lower end welded perpendicularly to the left back corner area of said bottom frame;
    said right back leg has a lower end welded to the right back corner area of said bottom frame;
    said top frame comprises two top side frame elements, each having a forward end and a rearward end, and a top back mid-frame element, wherein said mid-frame element extends between said two top side frame elements at a predetermined distance from said rearward ends of said two top side frame elements;
    the bottom of said left back frame element of said front frame and the bottom of said right back frame element of said front frame are welded to opposing outer corner areas of said bottom frame;
    said rectangular top platform is welded to said top frame, to said mid-frame element, and to the center of said top front frame element;
    said top frame, said mid-frame element, and said top front frame element extend upward from said top platform to create a top lip; and
    said tank platform is welded to the bottom of said lower tank frame with said lower tank frame extending upward from said bottom platform to form a tank lip.

13. The portable hand cart for carrying welding equipment, as recited in claim 12, wherein said rear-extending upper cradle is positioned to hold a standard compressed gas cylinder in a manner in which, when said portable hand cart is tilted backward, the weight of said standard compressed gas cylinder offsets any weight from said welding equipment carried on said top platform and said bottom platform.

14. A portable welding cart for carrying a welding unit, tools, and an electrical extension cord, comprising:
    a rectangular bottom frame;
    a rectangular bottom platform welded below said bottom frame with said bottom frame extending upward from said bottom platform to create a bottom lip;
    a single piece of metal bent to form a back frame comprising a left back leg having an upper end and a lower end with said lower end welded perpendicularly to the left back corner area of said bottom frame, a right back leg having an upper end and a lower end with said lower end welded perpendicularly to the right back corner area of said bottom frame, and an angled handle disposed between said upper end of said left back leg and said upper end of said right back leg, wherein said angled handle is angled backward from a plane formed by said right back leg and said left back leg, and wherein said handle is configured with two opposing cord hangers disposed on the exterior-facing portion of said handle;
    a top frame comprising two top side frame elements, each having a forward end and a rearward end, and a top back mid-frame element welded between said two top side frame elements at a predetermined distance from said rearward ends of said two top side frame elements, wherein said top frame is narrower than said bottom frame;
    a front frame of a single piece of metal shaped to form a left front frame element continuing to a first rounded corner continuing to a top front frame element continuing to a second rounded corner and continuing to a right front frame element, wherein the bottom of said left back frame element and the bottom of said right back frame element are welded to opposing outer corner areas of said bottom frame;
    a rectangular top platform welded to the bottom of said top frame, to the bottom of said mid-frame element, and to the bottom of the center of said top front frame element, wherein said top frame, said mid-frame element, and said top front frame element extend upward from said top platform to create a top lip;
    two swivel caster-type front wheels operatively attached near opposing front corners of said bottom platform;
    two rear wheels carrying pneumatic tires operatively attached at a back area of said bottom frame;
    a rear-extending lower tank frame formed of a single piece of metal bent to form a first tank frame side, a mid tank frame side, and a second tank frame side, wherein the end of said first tank frame side and the end of said second tank frame side are welded to a rear area of said bottom frame;
    a tank platform welded below said lower tank frame with said lower tank frame extending upward from said bottom platform to form a tank lip, wherein said tank frame and said tank platform are configured to support the bottom of a compressed gas cylinder; and
    a rear-extending upper cradle welded to the back portion of said top frame and extending rearward past the plane formed by said left back leg and said right back leg and configured to support a side of said compressed gas cylinder, wherein said cradle comprises two curved cradle sides with a flattened cradle portion disposed between said two curved sides; said cradle has a width somewhat wider than the radius of said compressed gas cylinder; said cradle is welded to a middle area of said mid-frame element; and each of two curved cradle sides are configured with a chain attachment mechanism.

15. A portable welding cart for carrying a welding unit, tools, and an electrical extension cord, as recited in claim 14, wherein said rectangular bottom frame, said back frame, said top frame, said front frame, and said lower tank frame are formed of tubular metal.

16. A portable welding cart for carrying a welding unit, tools, and an electrical extension cord, as recited in claim 15, wherein said bottom platform, said top platform, and said tank platform are formed of sheet metal.

* * * * *